INVENTOR.
James Kantor,
BY
Hood & Hahn
ATTORNEYS

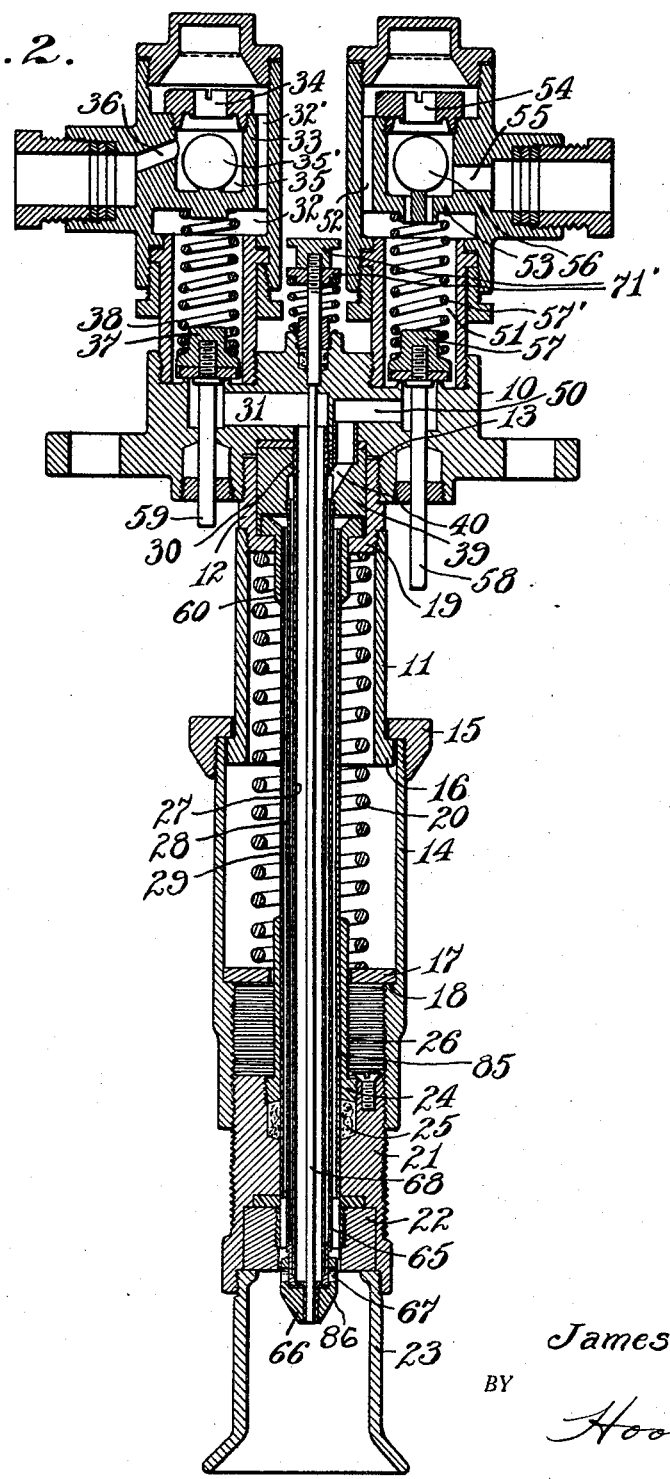

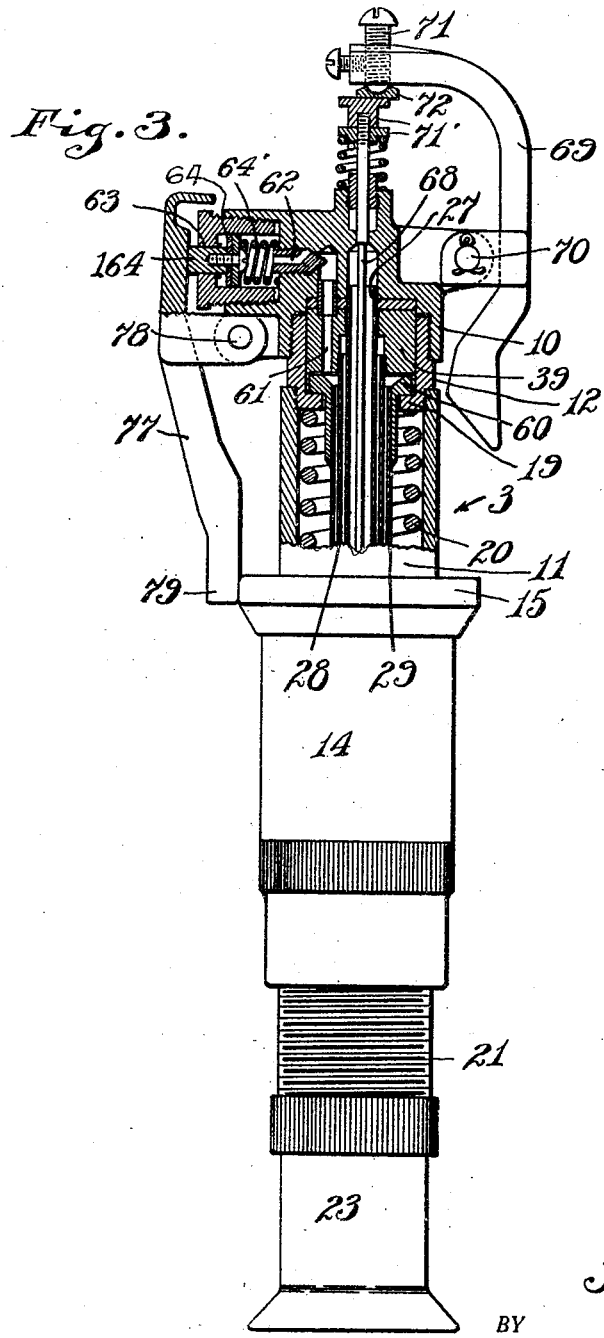

Patented Mar. 7, 1933

1,900,447

UNITED STATES PATENT OFFICE

JAMES KANTOR, OF CHICAGO, ILLINOIS, ASSIGNOR TO THE LIQUID CARBONIC CORPORATION, OF CHICAGO, ILLINOIS, A CORPORATION OF DELAWARE

FILLER VALVE FOR BOTTLE FILLERS

Application filed May 11, 1929. Serial No. 362,237.

My invention relates to improvements in bottle filling machines and more particularly to the filling valve for said machine.

It is one of the objects of my invention to provide an improved automatic filling valve which will insure the delivery of the carbonated water to the bottle to be filled without agitation and without disturbing the syrup contained in the bottle.

Another object of my invention is to provide a filling valve which after the supply of carbonated water has been shut off will prevent continued dripping of the liquid.

Another object of my invention is to provide an improved form of filling valve which will quickly and readily relieve the accumulation of air and carbon-dioxide gas in the top of the bottle, after the same has been filled and thereby relieve the pressure at this point.

Other objects and advantages will appear more fully hereinafter in the specification and the appended claims.

For the purpose of disclosing my invention, I have illustrated one embodiment thereof in the accompanying drawings, in which:

Fig. 2 is a detail longitudinal sectional view of the filling valve and

Fig. 3 is another detail longitudinal sectional view, taken at right angles to that of Fig. 2, of the filling valve.

Figure 1:
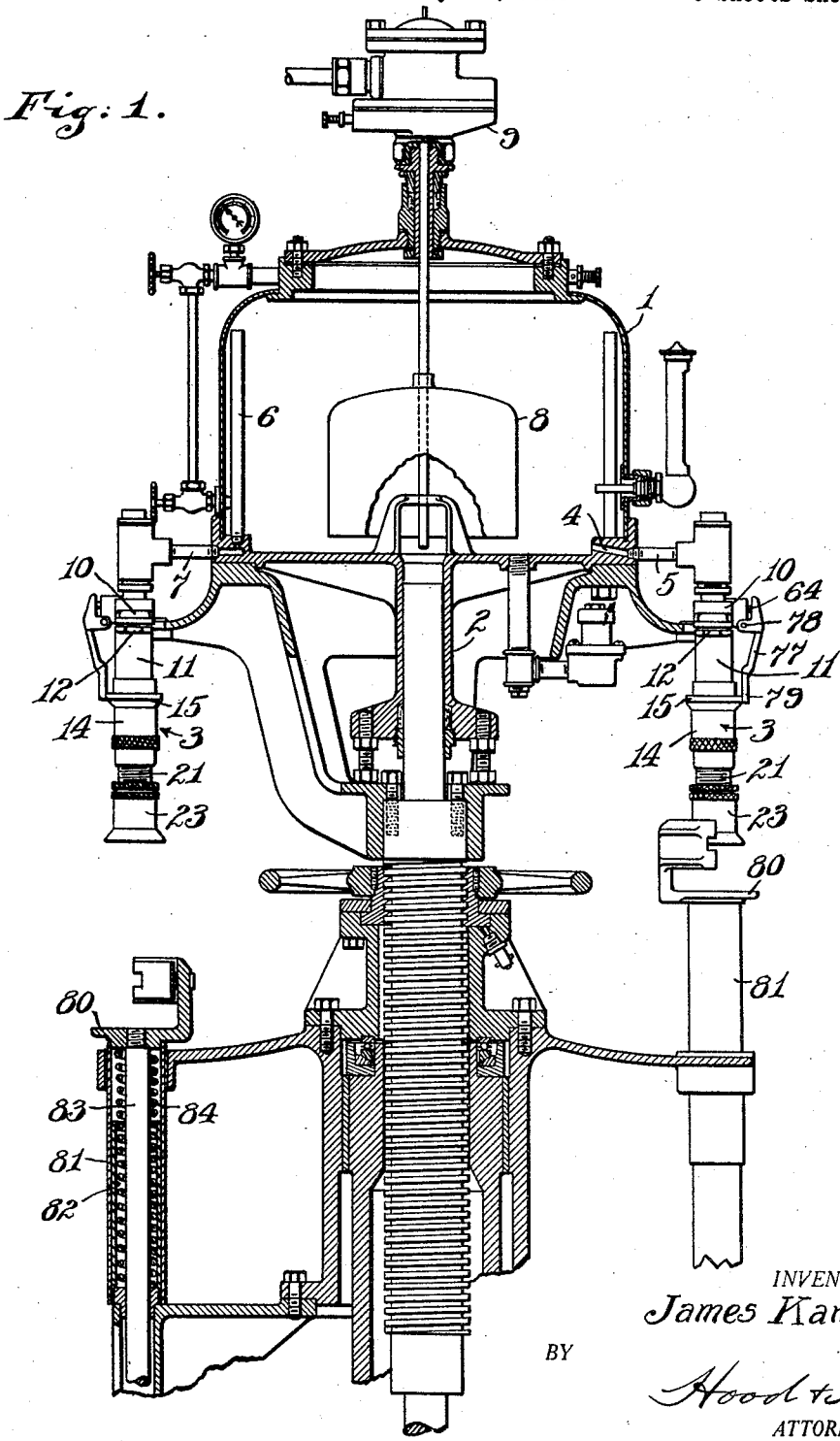
Fig. 1 is a longitudinal sectional view of so much of a bottle filling machine as is necessary to disclose my invention.

In the embodiment of the invention illustrated, I provide a filling machine having a filling tank 1 provided with a carbonated water inlet 2. This tank has radially arranged thereof a plurality of filling valves 3, each of which communicates with a discharge opening 4 in the tank through a suitable pipe connection 5. Each of these valves also communicates with a pipe 6, the inlet opening of which is above the normal water level of the tank, by means of a pipe 7. The water level is maintained in this tank at a point about half way to the top of the tank by means of a float 8 which controls the operation of a valve 9, in turn controlling the pressure admitted to the top of the tank. By the variation of this pressure, admission of water to the tank is controlled, in accordance with the amount which is withdrawn therefrom.

Each of the valves 3 comprises a base 10 by which the valve structure is supported from the tank and which is provided with a series of ports hereinafter more fully described. This base supports a tubular casing 11, through a nipple 12 screw threaded into a socket 13 in the base 10 and threadedly receiving the end of the casing 11. Telescoping this tubular casing is a second casing 14, the downward movement of which is limited by a ring 15 threaded on to the top of the casing 14 and adapted to engage, when the second casing 14 is in its downward limited movement, an annular flange 16 on the casing 11. This casing 14, near its lower end, is provided with a head 17 resting on a shoulder 18 within the casing, and interposed between this head and an inturned flange 19 on the nipple 12 is a coiled spring 20, which biases the casing 14 toward its outermost position.

A sealing head 21 is threaded into the lower end of this casing 14 and carries at its bottom a gasket 22 which is countersunk in the head. This sealing head also supports at its lower end a bottle guide neck 23 which receives the neck of the bottle when the same is raised to filling position. The head 21 also carries on its upper end a nut 24, threaded into the head, against a packing gasket 25 and this nut is provided with a tubular neck 26 which extends upwardly and through the head 17.

Arranged within the casing, formed by the two casing tubes 11 and 14, are the water tube 27, the counter-pressure tube 28 and the snifter tube 29. These tubes are arranged one within the other and are so mounted that none communicates with the other. The water filling tube 27, at its upper end, is screw threaded into a socket 30 in the base 10 and communicates through a port 31 with a chamber 32 which in turn is connected with the pipe 5 and is thus in communication with the tank 1. This chamber has a passage 32′ extending around an interior ball casing 33 and communicating through the port 34 with a ball chamber 35, in turn opening as at 36 to the pipe 5. Arranged within this ball chamber 35 is a ball valve 35′ adapted to control the opening 34 and, under certain predetermined conditions, to close the same. The port 31 is controlled by a valve 37 which is biased toward its closed position by a coiled spring 38.

The counter-pressure tube 28 is screw threaded into a block 39 mounted in the base 10 and maintained in position therein by the flange 19 and communicates through a port 40 and port 50 with a chamber 51 having a passage 52 around a ball valve casing 53, the chamber of which communicates with chamber 51 through said passage 52 and a port 54; and by means of a port 55 communicates through the pipe connection 7 with the pipe 6 in the tank 1. The port 54 is adapted to be controlled under certain predetermined conditions by a ball valve 56.

The port 50 is controlled by a valve 57 biased toward closed position by a coiled spring 57' and this valve is provided with an operating stem 58, similar to the operating stem 59 for the valve 37 but of somewhat greater length.

The snifter tube 29 sockets in the nipple 60 which is maintained in position by the annular flange 19 and communicates through port 61, (see Fig. 3) the needle valve 62 and the valve opening 63 with the atmosphere. This valve opening 63 is controlled by a valve 64 having a stem 164 of X-section guided in said opening 63, said valve being biased toward its closed position by a coiled spring 64'. The lower end of the snifter tube 29 opens into the bottle neck guide 23. The lower end of the counter-pressure tube 28 opens to the bottle neck guide 23 through openings 65 in the sides of said tube, and the bottom end of the water tube 27 likewise communicates with the bottle neck guide.

The lower end of the water supply tube is controlled by a pear shaped valve 66, the upper end of which is hollow and adapted to telescope the lower end of the water supply tube. This hollow portion of the valve is provided with discharge openings 67 at diametrically opposite points in its sides through which, when the valve is moved to opened position, the water from the tube 27 discharges. This valve is mounted on the lower end of a control rod 68 which extends through the supply tube 27 and upwardly through the base 10 to the top thereof. This valve is operated by a lever 69 pivoted at 70 to the base 10 and carrying at its upper end an adjustable screw 71 adapted to make contact with the top of the rod 68. To this end the upper end of the rod is provided with a pair of lock nuts 71' on which rests a socket washer 72 in which bears the rounded bottom of the screw 71. By this arrangement, the extent of the opening of the valve 66 may be regulated.

The lower end of the lever 69 is in the path of the ring 15 when the telescoping tubular casing 14 is raised and the lower end of the lever 77 is likewise disposed in the path of said ring. The lever 77 is pivoted at 78 to the base 10 and operates the snifting valve 64. This lever 77 has a lower offset portion 79 which normally bears against the outer periphery of the ring 15 while the ring is during its lowermost position and in a portion of its upward travel. However, as the ring approaches the limit of its upward travel it passes off of this portion, allowing the lever to move to a position to permit the valve 64 to close.

The bottles are adapted to be supported on bottle platforms, one for each filler valve. Each of these platforms 80 is mounted on the upper end of a guide tube 81 telescoping a stationary guide tube 82 and each platform is provided with an operating rod 83 provided with means at its lower end for controlling its vertical movement. The platform is biased toward its raised position by a spring 84 and its vertical movement is controlled by suitable cams (not shown).

In operation, when the bottle on its platform 80 rises beneath the filling valve, a cam permits the platform, under the influence of spring 84, to raise the bottle with the mouth of the same in contact with the gasket 22. The bottle continues to move upwardly raising with it the tubular casing 14, until finally the ring 15 contacts with the stem 58 of the counter-pressure valve 57, opening this valve and thus permitting the counter-pressure gas which accumulates in the top of the tank 1 to flow through the pipe 6, the port 50, and the counter-pressure tube 28 into the bottle. The period for which this valve is allowed to remain open is determined by the length of the cam. The bottle continues to move upwardly thus continuing the raising movement of the ring 15 until eventually this ring contacts with the stem 59 of the water valve 37, opening this valve and allowing the carbonated water from the tank 1 to flow through the pipe 5 and the port 31 into the water tube 27. At the same time the ring 15 contacts with the cam face of the lever 69 thereby depressing the rod 68 and lowering the valve 66 until the oppositely disposed openings 67 are clear of the lower end of the water tube, thus permitting the water to flow through these openings into the bottle. Due to the fact that the two openings 67 in the water control valve are directly opposite one another or 180 degrees apart, the two streams of water falling down the opposite sides of the bottle come together at the bottom of the bottle and one stream neutralizes the force of the other to prevent agitating the syrup or setting up a swirling action in the syrup. It is extremely desirable that the water be delivered to the bottle with a minimum agitation of the syrup, as such agitation will cause water to mix with the syrup and start to foaming. At the same time that the ring is moving upward into engagement with the lever 69 and the valve stem 59, this ring moves out of contact with the extension 79 of the lever 77, so that the snifter valve 64 is closed during the water flow into the bottle. As the bottle is filling with water, the counter-pressure which has been admitted thereto and the air in the bottle passes back through the counter-pressure tube 68 and back into the tank 1. Eventually the water fills the bottle to the point where the openings 65 in the counter-pressure tube are closed by the water, thus preventing any further flow of air or gas upwardly through the counter-pressure tube. Under these circumstances, a pocket of gas or gas and air is trapped in the top of the bottle and the pressure of this trapped gas or gas and air becomes equal to the pressure of the inflow of water, thus stopping the flow of the water. The bottle at this point commences its downward movement which immediately releases the lever 69 permitting the water valve 66 to close the end of the water tube 27 and at the same time releasing the water valve 37 shutting off the flow of water. On its downward movement, the ring 15 engages the offset end 79 of the lever 77 moving the lever to a position to open the snifter valve 64 thereby permitting the escape of the accumulated pressure in the top of the bottle, after the same has been filled through the filling tube 27. The snifter tube in addition to its opened bottom is provided at a point well removed from its lower end with a plurality of openings 85. These openings are sufficiently removed from the bottom of the tube 29 so that, under no circumstances, will they become covered with water. In other words, they are well above the highest water level in the bottle. This insures the quick release of the top pressure in the bottle through the snifter tube upon the opening of the snifter valve 64.

Due to the fact that the valve 66, with its fiber washer 86, closes the bottom end of the water tube 27, when the water control valve 37 is closed, this water tube is sealed, thus preventing draining and dripping of the water from the tube. This draining or dripping of the water from the tube makes it difficult to obtain uniform filling heights in the bottle. By the above arrangement, however, this is obviated by the closing of the valve 66.

I claim as my invention:

1. In a bottle filling machine, the combination with a relatively stationary filling tube, of a sleeve telescoping said tube and movable with the bottle when the same is moved into and out of filling position, a valve operated by said sleeve for controlling the admission of fluid to said tube and a second valve normally cooperating with the discharge end of said tube to close the same, and operated by said sleeve to open and close with said first valve.

2. In a bottle filling machine, the combination with a filling tube, of a sleeve telescoping said tube and movable with the bottle when the bottle is moved into and out of filling position, a valve operated by said sleeve for controlling the admission of fluid to said tube and a second valve having a seat engaging the end of said tube to close the same when said first mentioned valve is closed.

3. In a bottle filling machine, the combination with a filling tube, of a sleeve telescoping said tube and movable with the bottle when the same is moved into and out of filling position, a valve operated by said sleeve for controlling the admission of fluid to said tube and a second valve adapted to close the discharge end of said tube when said first mentioned valve is closed, said second valve having a seat engaging the end of the tube and provided with a sleeve portion telescoping the end of the tube and provided with diametrically opposite discharge openings.

4. In a bottle filling machine, the combination with a relatively stationary filling tube, of a sleeve telescoping said tube and movable with the bottle when the same is moved into and out of position, a valve operated by said sleeve for controlling the admission of fluid to said tube, a second valve for normally closing the discharge end of the tube, and means extending axially through said tube and movably operated by said sleeve for controlling the operation of said second valve.

5. In a bottle filling machine, the combination with a filling tube, of a sleeve telescoping said tube and movable with the bottle when the same is moved into and out of filling position, a valve operated by said sleeve for controlling the admission of fluid to said bottle, said valve having discharge openings extending at angles to the axis of said tube and disposed diametrically opposite one another.

6. In a bottle filling machine, the combination with a filling tube, of a counter-pressure tube surrounding said filling tube having an outlet opening above the discharge opening of the filling tube and a snifter tube surrounding said counter-pressure tube having an inlet opening at its lower end above the opening of the counter-pressure tube and additional inlet openings at a higher point in the length of said tube, and a valve controlling sleeve surrounding said tubes having means for engaging the top of the neck of the bottle for sealing the bottle and through which said tubes are adapted to project into the neck of the bottle.

7. In a bottle filling machine, the combination with a filling tube, of a tube surrounding said filling tube and with said filling tube adapted to be projected into the bottle to be filled and having an intake opening in its lower end above the discharge opening of the filling tube and an additional intake opening therein located at a point above the first mentioned intake opening and in a position to be within the bottle during the filling operation thereof, and a valve controlling sleeve surrounding said tubes having means for engaging the top of the neck of the bottle for sealing the same and through which said tubes are adapted to be projected into the neck of the bottle, said second mentioned opening, when the first mentioned tube is projected into the bottle, being in open communication with the interior of the bottle but always disposed above the liquid level in the bottle.

In witness whereof, I, JAMES KANTOR have hereunto set my hand at Chicago, Illinois, this 6 day of May, A. D. one thousand nine hundred and twenty nine.

JAMES KANTOR.